United States Patent
Hallock et al.

[11] Patent Number: 5,941,037
[45] Date of Patent: Aug. 24, 1999

[54] OXYGEN SCAVENGING HYDROTALCITE AND COMPOSITIONS CONTAINING SAME

[75] Inventors: John Scott Hallock, Ellicott City; Drew Ve Speer, Columbia, both of Md.

[73] Assignee: W. R. Grace & Co.-Conn, New York, N.Y.

[21] Appl. No.: 08/975,830

[22] Filed: Nov. 21, 1997

[51] Int. Cl.⁶ .............. C08K 3/30; C08K 3/24; C08K 3/22
[52] U.S. Cl. .......... 52/407; 206/524.6; 426/106; 423/518; 423/519.2; 423/592; 423/594; 423/595; 423/600; 524/413; 524/419; 524/421; 524/431; 524/436
[58] Field of Search .................. 423/519.2, 518, 423/594, 595, 600, 592, 596; 524/436, 419, 421, 413, 407, 431; 426/106; 206/524.6

[56] References Cited

U.S. PATENT DOCUMENTS

| | | |
|---|---|---|
| 4,536,409 | 8/1985 | Farrell et al. . |
| 4,675,356 | 6/1987 | Miyata . |
| 4,702,966 | 10/1987 | Farrell et al. . |
| 5,075,362 | 12/1991 | Hofeldt et al. . |
| 5,211,875 | 5/1993 | Speer et al. . |
| 5,284,871 | 2/1994 | Graf . |
| 5,399,329 | 3/1995 | Schutz et al. . |
| 5,507,980 | 4/1996 | Kelkar et al. . |
| 5,776,424 | 7/1998 | Martin et al. . |
| 5,861,133 | 1/1999 | Okada et al. .................. 423/519.2 |

FOREIGN PATENT DOCUMENTS 4425266  10/1995  Germany .

OTHER PUBLICATIONS

Anionic Clay Minerals; Reichle—Chemtech Jan. 1986.
Anion–Exchange Reactions of Layered Double Hydroxides; Meyn et al—Inorg. Chem. 1990, 29, 5201.
Characterization of Anion Exchanged Hydrotalcite and Determination of the Site of Exchanged SO4 Group; Sato et al—Clay Science 8, 309–317 (1992).
Rehydration of Zn–Al Layered Double Hydroxides; Kooli et al—Clays and Clay Minerals, vol. 45, No. 1, 92.
Intercalation of Organic and Inorganic Anions into Layered Double Hydroxides; Chibwe et al—J. Chem. Soc., Chem. Communic., 1989, p. 926.
Adsorption of N2, O2 CO2 and H2 on Hydrotalcite–Like System: Mg2+–Al3+– (Fe(CN)6)4–; Miyata et al—Clays and Clay Minerals, vol. 26, No. 6, p. 441, 1978.

Primary Examiner—Veronica P. Hoke
Attorney, Agent, or Firm—Howard J. Troffkin

[57] ABSTRACT

An oxygen scavenging agent and compositions capable of providing good oxygen absorption capabilities which contain said agent, wherein the agent is a modified anionic hydrotalcite particulate material.

27 Claims, No Drawings

OXYGEN SCAVENGING HYDROTALCITE AND COMPOSITIONS CONTAINING SAME

Background of the Invention

The present invention relates to a novel agent and resultant compositions that can be used to retain product quality and improve shelf life of oxygen sensitive materials, and to intermediate shaped structures, e.g., films, coatings, 3-dimensional solids, fibers, webs and the like which contain said composition, as well as to shaped products into or onto which said composition or structure are incorporated or applied to, be part of or attached to the container structure.

The present agent is a modified anionic hydrotalcite-like particulate. It may be formed into a composition composed of said agent in a carrier which permits the agent to combine with oxygen when in the presence of moisture. Specifically, the composition utilizes modified anionic hydrotalcite-like particulates which have certain anionic groups, as fully described herein below. The particulate containing oxygen scavenging composition of the present invention has unexpectedly been found to provide effective absorption of oxygen from the interior of a container without adversely affecting the color, taste or smell of the packaged products contained therein which is normally associated with conventional agents and/or oxidation by-products thereof.

The subject oxygen scavenging composition has the ability to effectively chemically combine with oxygen in contact therewith, such as from the interior of a container, without undue migration of the oxygen scavenging agent or its oxidation by-product(s) out of the composition's matrix. The inhibition of migration is of particular advantage in that it significantly reduces or eliminates adverse effects on the color, taste, or smell of articles in contact with the matrix composition as well as provides a means of using high levels of scavenging agent while meeting government regulations directed to amounts of extraneous material permitted in food products.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container or its closure means.

It is known to include an oxygen scavenger agent in sheet material. The oxygen scavenger agent reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It would be very desirable to be able to significantly improve the shelf life while continuing to use conventional materials for the formation of the container body, the container closure and, where applicable, the gasket between the body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons for use as oxygen scavengers in packaging films.

It is known in the art that ascorbate compounds (ascorbic acid, its alkali metal salts, optical isomers, and derivatives thereof) as well as sulfites, bisulfites, phenolics, etc. can be oxidized by molecular oxygen, and can thus serve as an oxygen scavenging material, for example, as a component of a closure compound. For example, U.S. Pat. No. 5,075,362, issued to Hofeldt et al., discloses the use of ascorbate compounds in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. Copper ascorbate is used in the examples. The reference indicates that relatively high level of $Cu^{2+}$ (~5 ppm) are required in the food for scavenging to be effective but indicates that small amounts of the $Cu^{2+}$ can combine with oxygen in food to cause food spoilage. In order to avoid spoilage, one is required to reduce the amount of headspace $O_2$ or partially flush the container with an inert gas (Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts. When such catalysts are combined with an ascorbate compound in a polymeric matrix, e.g., a PVC closure formulation, they are effective in catalyzing the oxidation of the ascorbate compound, and increase the oxygen scavenging rate of the ascorbate.

In each of the above references, the active component of the oxygen scavenging systems utilized agents which readily transfer into the food or other packaged product or materials or which produce oxidation by-products which are known to adversely affect a wide range of packaged material.

Hydrotalcite is a naturally occurring mineral commonly classified as a clay. Generally speaking, clays break down into broad groups of being cationic materials which are commonly found in nature or anionic materials, which is rarely found in nature. These materials are used in a wide range of applications, such as industrial absorbents, catalysts, fillers, decolorizing agents and the like. Naturally occurring hydrotalcite are hydroxide-carbonate minerals of the formula

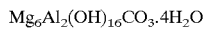

$Mg_6Al_2(OH)_{16}CO_3 \cdot 4H_2O$

It is well known that the hydrotalcite mineral is strongly bonded to the carbonate. The carbonate may be driven off by thermal calcination.

Recently, hydrotalcites with anions other than carbonate have been synthesized. They are generally layered double hydroxides (LDH) which include anionic hydrotalcite-like compounds (HTLC). They have been described in U.S. Pat. Nos. 5,399,329 and 5,507,980 as well as by W. T. Reiche in Chem Tech (1986) 58–63, the teachings of which are incorporated herein in their entirety by reference. These new materials have anions in its crystal structure which are easily exchanged. Although the known HTLC may have variations in the cationic and anionic groups, these materials have not been suggested as oxygen scavenger materials nor, in general, found useful in food packaging applications.

It is highly desired to provide an effective oxygen scavenging material and system which has good oxygen absorption capabilities and capacity and which does not adversely effects the color, taste or smell of the packaged material.

It is further desired to provide a material and system which is capable of inhibiting the release of oxidation by-product(s) which may adversely effect the color, taste or smell of the packaged material.

It is further desired to provide an effective oxygen scavenging system which has the active scavenger agent contained within a carrier and the agent still provides effective scavenging capacity.

It is further desired to provide an effective oxygen scavenging system which is thermally stable and, thereby, capable of allowing the packaging system to be formed by conventional techniques which include elevated temperature processing steps.

SUMMARY OF THE INVENTION

The present invention is directed to an oxygen scavenging agent and composition capable of providing good oxygen absorption capabilities while not adversely affecting the color, taste or smell of material packaged within a container which has said composition as a part thereof. The present oxygen scavenging agent is a modified anionic hydrotalcite particulate material. The present oxygen scavenging composition is formed of a polymer or the like carrier having the hydrotalcite particulate material impregnated therein. The oxygen scavenging system is capable of being activated by moisture. The present invention is further directed to a shaped structure containing or derived from the subject composition and to containers which are formed with or contain the subject composition.

DETAILED DECSRIPTION

The present invention is directed to an oxygen scavenging composition formed of a carrier containing an effective oxygen scavenging amount of a modified anionic hydrotalcite-like material distributed therein, as fully described herein below.

The carrier can be a polymer matrix in which the subject particulate material is substantially uniformly distributed, or a film or mat (woven or non-woven) having the subject particulate material substantially uniformly distributed therein or deposited thereon, or a moisture permeable pouch or sachet which contain the subject particulate distributed therein.

The present invention further provides an improved container for packaging materials, such as food, beverages and the like, which are susceptible to oxidative degradation. The present improved container is capable of retaining product quality and enhanced shelf life of the packaged material without adversely affecting the color, taste or smell of the packaged material by the present oxygen scavenging composition. It further provides a packaging system which can have high levels of oxygen scavenger agent therein while meeting government regulatory standards related to amounts of such agents contained in food products.

The anionic hydrotalcite-like material which is an oxygen scavenger agent of the present invention has the general formula:

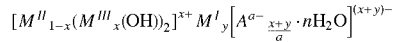

$[M^{II}_{1-x}(M^{III}_x(OH))_2]^{x+} M^I_y \left[ A^{a-}_{\frac{x+y}{a}} \cdot nH_2O \right]^{(x+y)-}$ wherein $M^{II}$ represents magnesium (preferred), zinc, nickel, copper or cobalt or mixtures thereof in their plus 2 valence state, $M^{III}$ represents aluminum (preferred), chromium, or iron or mixtures thereof in their plus 3 valence state. In certain instances the present HTLC may further contain cations $M^I$ which represents an alkali metal cation such as sodium (preferred), potassium or the like having a plus 1 valence state. $M^I$ may be present, when "a" (as defined below) has a value of at least 2, in a molar amount y equal to a value of from 0 to about 0.5. The molar ratio of $M^{II}$ to $M^{III}$ is from 1 to 5; OH represent hydroxyl groups; x has a numerical value of from about 0.1 to 0.5; and n has a numerical value of from 0 to 4 and generally from 1 to 4.

The symbol A of the above formula represents, at least in part, an oxygen scavenger group containing anion. Such oxygen scavenger group containing anion may be, for example, inorganic anions such as sulfite, bisulfite, dithionite and the like which are capable of reacting with oxygen or organic anions such as, for example, ascorbates, thiolates or phenolates and the like which are capable of reacting with oxygen. The remainder of the anion A being residual anion of the precursor HTLC, as fully described herein below. The anion A should be at least about 60 mole %, preferably at least about 80 mole % and most preferably at least about 90 mole % in the form of the oxygen scavenging inorganic or organic anions described above with the remainder being residual anions of the original hydrotalcite and/or other anions. The symbol "a" of the above formula represents the numerical value of the valence of the anion A. For example, the value of "a" for a sulfite or dithionite anion is 2 while the value of "a" for the bisulfite, ascorbate or phenolate is 1. The value of "a" for the residual anion will depend on the identity of the anion and, in general, will have a value of from 1 to 3.

In general, when the subject modified anionic hydrotalcite-like material has anions A which predominately represents monovalent anions, such as bisulfite, phenolate or ascorbate, as described above, or is formed in a manner which does not yield $M^I$ as part of the resultant product, the subject oxygen scavenger agent of the present invention can be represented by the general formula:

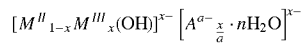

wherein each symbol is the same as defined above.

The term "ascorbate anion" as used herein and in the appended claims refers to the deprotonated species of ascorbic acid in either its D or L form and any derivative, or analog thereof, including, for example, erythorbic acid and mixtures thereof. It is preferred that the ascorbate anion be selected from the deprotonated species of D- or L-ascorbic acid, or fatty acid derivatives of ascorbic acid as well as mixtures thereof.

The term "phenolate anion" as used herein and in the appended claims refers to (i) deprotonated hydroxyl group containing aromatic ring or condensed aromatic ring compound. Examples of phenolic compounds from which the phenolate anion can be derived include phenol, pyrocatechol, recorcinol, pyrogallol, pyrochatechol monoethyl ether, resorcinal monoethyl ether, hydroquinone, 1,2,4-trihydroxybenzene, tetrahydroquinone, 2,4-dibutylphenol and the like; or (ii) hydroxyl group containing aromatic ring or condensed aromatic ring compounds which further contain a deprotonated carboxylic acid group such as salicylate anion, 3-hydroxy benzoate, 4-hydroxy benzoate, 3,4,5-trihydroxybenzoate and the like.

The term "hydrotalcite-like" is a recognized term in the art (See Cavani et al, Catalyst Today 11173 1991) and is used herein in a manner consistent with such usage.

The subject modified anionic hydrotalcite-like materials can be formed by a variety of means. In one instance, an anionic HTLC having a labile anion can be used as the precursor in forming the present material. The anion of the precursor anionic hydrotalcite-like material should be sufficiently labile to be readily exchanged with the oxygen scavenger anion. HTLC having lower alkanoic acid anions, such as a $C_1$–$C_5$ monocarboxylic acid anion (e.g., anions of formic, acetic, propionic, or butyric acid or the like) is a preferred anionic HTLC to be used as the precursor material. The formation of such precursor material is disclosed in U.S. Pat. No. 5,399,329, the entire teachings of which are incorporated hereby reference. The present oxygen scavenging agent is formed by anion exchange of the above-described precursor material, in the absence of oxygen, with alkali metal or akaline earth metal salts of an oxygen-scavenger anion, described herein above.

Alternately, the subject modified anionic hydrotalcite-like material can be formed by reacting, in the absence of oxygen, either the salt or conjugated acid (protonated form) of at least one of the subject oxygen scavenger anions with HTLC having carbonate anions. The reaction may be carried out in deoxygengated water as the reaction media. The reaction product is washed with deoxygenated water in the absence of oxygen to produce a water insoluble oxygen scavenger active material of the present invention.

Still another manner of forming the subject modified anionic hydrotalcite-like material utilizes previously calcined hydrotalcite. The calcined hydrotalcite without associated anions can be reacted with conjugate acids of the above-described oxygen scavenging anions in the absence of oxygen to yield the subject materials. In the case of bisulfite or sulfite this may be accomplished using a solution of sulfur dioxide in water. In yet another method, an appropriate source of trivalent metal (such as aluminum hydroxide) may be reacted, in the absence of oxygen, with an appropriate source of divalent metal (such as magnesium oxide or nickel hydroxide) in the presence of conjugate acids of the above described oxygen scavenging anions to yield the subject materials.

The oxygen scavenging agent of the present invention has been found to provide effective oxygen scavenging activity and rate when the agent is placed in the presence of oxygen and moisture. Thus, the presently described HTLC must be maintained in the absence of oxygen during formation and the absence of oxygen or moisture during storage. When the present agent is formulated into an oxygen scavenging composition with a carrier, such as a polymeric matrix, the carrier should be able to maintain the agent substantially free from moisture to the degree needed to trigger (initiate) a high rate of oxygen scavenging to occur to provide preservation of the packaged goods contemplated.

The preferred oxygen scavenger agent of the present invention preferably has magnesium as $M^{II}$. However, the magnesium may be partially (up to about 50 mole percent) substituted from the family of cations selected from nickel, cobalt, zinc, copper, manganese or mixtures thereof. Further, the preferred agent has aluminum as $M^{III}$. However, the aluminum may be partially (up to about 50 mole percent) substituted from the family of cations selected from chromium, iron or mixtures thereof.

The subject modified HTLC has been unexpectedly found to provide a desirable means of providing large degree of oxygen scavenging activity to the subject composition and, thereby, provide enhanced capacity and activity to scavenge oxygen while not allowing the initial oxygen scavenging material and/or any resultant oxidation by-product migrate into or adversely effect the color, taste or smell of articles in contact with the subject composition.

It is believed, though not meant to be a limitation on the present invention, that the precursor HTLC has the capacity to have the oxygen scavenger anions described above become part of the structure of the HTLC. Because the present oxygen scavenging HTLC has a plate-like structure with a small thickness of about 0.005 to 0.1 microns (typically from 0.02 to 0.06 microns) and an aspect ratio of breadth to thickness of at least about 50 and generally in the range of from 50 to 5000 and typically from 50 to 1000, the major ion exchange occurs on the plate surface. This permits the oxygen scavenger anion to be capable of readily reacting with oxygen in the presence of moisture to provide a desired oxygen scavenger agent. Further, it is believed that the presently modified HTLC reacts with any oxidation by-products (through the hydroxyl group) or the oxidation by-products which may form are adsorbed on or absorbed within the crystal structure of the subject modified HTLC.

The subject oxygen scavenger agent is formed by anion exchange to provide an oxygen scavenger anion containing HTLC as described above. The anion A of the present agent should be at least about 60 mole percent oxygen scavenger anion, with preferably at least about 80 mole percent and most preferably at least about 90 mole percent. Lesser mole percentages may be acceptable where the lower amount still provides sufficient oxygen scavenging activity for a particular application. The exact percentage can be readily determined by one skilled in the art. However, the high degree of anionic sites located on the surface of the HTLC provides the ability to provide an oxygen scavenger of high capacity. Such capacity enables one to achieve extended storage capacity of the resultant packaged product. The amount of oxygen scavenging agent will depend on the anticipated application of the resultant scavenging composition. When large amounts of composition are used to scavenge small volumes of oxygen (such as in can coating applications), the amount of oxygen scavenging agent can be as low as about 0.5 weight percent of the composition and preferably at least 1 weight percent of the composition. In other conventional applications, such as cap liners and the like, where the loading of the particulate in the polymer carrier is low and/or the amount of composition is small, the amount of oxygen scavenging agent should be at least about 2 weight percent, preferably from 2 to 20 weight percent, more preferably from 4 to 15 weight percent based on the weight of the composition. The exact amount of oxygen scavenging agent required for a particular application can be readily determined by the artisan. The present invention provides a means of achieving a wide range of scavenger agent content including high weight percentages.

The modified HTLC agent described above is a finely divided solid that is particularly suited to replace part or all of the filler commonly found in sealant or film compositions which are applications contemplated herein. The subject composition as a whole is effectively anhydrous, that is, it provides a moisture content lower than needed to trigger (initiate at a substantial rate) oxygen scavenging. Thus, it is preferred that the carrier component of the composition be a polymeric matrix which is also preferably anhydrous. Generally, the polymeric matrix substantially protects the scavenger from moisture under normal atmospheric conditions and, therefore the oxygen scavenger agent remains substantially inert to scavenging activity. However, once a high degree of moisture is attained, as in a closed package environment of food products, the scavenging activity is initiated or triggered. Moisture ingress into the polymeric matrix carrying the composition is conventionally accelerated by common practices such as hot filling, sterilization, pasteurization, retort and the like. The polymer matrix should be sufficiently permeable to permit moisture and oxygen to pass into the matrix's mass and contact the particulate material.

In one embodiment of the present invention, the carrier of the subject composition comprises a polymeric matrix material, that is to say polymeric material that will form a solid matrix having distributed therein the subject modified hydrotalcite oxygen scavenging agent particulate material. The polymeric matrix material will be selected having regard to the nature of the composition (dispersion, latex, plastisol, dry blends, solution or melt) and its utilization as part of the container in a conventional manner.

The polymeric matrix material is chosen from at least one polymeric material that can form a solid, or semi-solid matrix. The polymeric matrix material can be derived from a variety of polymers which are available from a variety of bulk physical configurations such as dispersion, latex, plastisol, dry blend, solution, or melt (e.g., thermoplastic meltable polymer). The particular physical configuration of the polymer selected will depend on the end structure into which the subject composition is eventually formed or incorporated. The polymeric matrix is derived from polymer types which may be thermoplastic or thermosetting.

The primary functions served by the polymer matrix for purposes of the, present invention are to provide a compatible carrier (a material which is stable under normal packaging temperature conditions and does not deactivate the oxygen scavenger activity of the present modified hydrotalcite agent) for the oxygen scavenging agent which is fully described herein above and to permit ingress of both oxygen and water into the composition and to permit them to come in contact with the oxygen scavenging agent. The scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include polyolefins, vinyl polymers, polyethers, polyesters, polyamides, phenol-formaldehyde condensation polymers, polysiloxanes, ionic polymers, polyurethanes, acrylics and naturally occurring polymers such as cellulosics, tannins, polysaccharides, and starches.

Suitable materials for use as the polymeric matrix component of latex compositions, e.g., for can ends, are described in U.S. Pat. Nos. 4,360,120; 4,368,828 and EP 0182674. Suitable polymeric materials for use when the compositions are organic solutions or aqueous dispersions are described in U.S. Pat. Nos. 4,360,120; 4,368,828; and GB 2,084,601. Suitable materials for use in thermoplastic compositions include the materials proposed in U.S. Pat. Nos. 4,619,848; 4,529,740; 5,014,447; 4,698,469; GB 1,112,023; GB 1,112,024; GB 1,112,025 and EP 129309. The teachings of each of the references cited herein above are incorporated herein by reference in their entirety.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, ethylene or propylene/carbon monoxide alternating copolymers, vinyl chloride homopolymers and copolymers, vinylidene dichloride polymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

Compositions according to the invention may utilize a polymeric matrix composed of thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Particularly preferred compositions are a plastisol or a dry blend of polymer may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxyester resins, epoxy resins, polyesters and alkyds. These resins are normally formed into solutions or suspensions with organic liquids and applied to the inner surface of a container followed by application of elevated temperature to remove the liquid and cause solidification (e.g., by crosslinking) of the resin coating on the substrate.

The polymeric matrix of the composition may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

A preferred aspect of the invention is that the oxygen scavenger agent should remain substantially inert in the composition and in the gasket or other solid deposit formed with the subject composition until the composition is on or in a sealed container. Exposure of the composition to high humidity that normally exists within a sealed container will, therefore, result in sufficient permeation of moisture into the composition and cause the subject oxygen scavenger to initiate a satisfactory degree of scavenging. This will result in improved shelf life of the packaged material. In addition, the scavenging reaction can be accelerated by heating the composition sufficiently while in the closed container to cause increased permeation of moisture. Thus, the oxygen scavenger agent will preferably remain substantially inert in the carrier until the scavenging reaction is accelerated by heating in the presence of moisture. Where the subject oxygen scavenger agent has a sufficient amount of water molecules associated with it to provide moisture required to cause oxygen scavenging, it is preferred that compositions having such hydrated particulate material be stored under an inert atmosphere until used.

Preferably the scavenging reaction of the present composition is accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject oxygen scavenger agent. The moisture becomes trapped in the composition, thereby bringing the scavenger agent into contact with sufficient water to permit reaction with the oxygen present. This oxygen may permeate through the composition either from oxygen trapped within the container when it was filled or which subsequently enters the container from the surrounding atmosphere.

While some conventional oxygen scavenging agents degrade when subjected to elevated temperatures, the subject oxygen scavenger agent has been found to be stable to elevated temperatures commonly experienced in processing polymers into films or coatings, removing solvents from plastisol compositions, pasteurization, sterilization and the like processes commonly encountered in packaging technology.

The polymeric matrix of the subject compositions may further contain inert filler, slip aids, process aids, pigments, stabilizers, anti-oxidants, tackifying resins, foaming agents and other conventional additives in conventional amounts, depending upon the nature of the composition and its final use. If the polymer matrix is part of a thermoplastic composition, the total amount of such additives is generally below 10%, most preferably below 3%, based on the total weight of the composition. However, when the composition is a plastisol, dispersion, organic solution or latex, the amounts of additives based on polymeric material may be higher. When an anti-oxidant is incorporated, it should be present in amounts capable of stabilizing the polymeric composition against degradation due to free-radicals formed during processing. However, the amount of anti-oxidant should be small enough to permit the subject oxygen scavenger agent of the composition to effectively react with molecular oxygen. The specific amount will depend on the anti-oxidant used and can be determined by minor experimentation.

The composition of the invention may be formulated in any convenient form, such as a melt, plastisol, organic solution, dry blend, latex or dispersion. The main ingredients of the composition, apart from the oxygen scavenger agent, are normally typical of those conventionally present for the intended purpose. It is preferred that the total composition should be non-aqueous (i.e., an anhydrous solution, plastisol or thermoplastic melt) so as to prevent initiation of the reaction of the scavenger within the composition. Alternatively, the scavenger may be encapsulated in a carrier sufficient to prevent it from contacting water and/or oxygen until within the closed environment of the container.

The polymer matrix carrier of the subject composition may be selected from those used to form coatings on at least a portion of the interior surface of a package (e.g., a rigid container such as a can, can lid, box, carton, or the like). The polymer matrix can be selected from polymer classes commonly referred to as epoxides, phenolics (e.g., phenol-formaldehyde condensation polymer), lacquers (e.g., cellulose esters or ethers, shellac, alkyl resins and the like), polyurethanes and the like. The carrier matrix may be mixed with the above described oxygen scavenger agent to provide an encapsulated particulate which may be subsequently used in a second polymer matrix or applied onto (such as by solvent or melt application) the surface of a second carrier material.

The subject composition can also be utilized to form a film which carries the present oxygen scavenger agent. The carrier can be formed from a polymeric material, such as those described herein above, capable of forming a film and upon the surface thereof is deposited the present oxygen scavenger. The film may be composed of a single layer or of a plurality of layers. The surface of the film can be coated with the subject oxygen scavenger agent by forming a suspension or dispersion of the particulate in a polymer and depositing the suspension or dispersion by a conventional means, such as spraying or knife coating application or the like, directly onto the surface of the carrier film. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat or by first forming particulates of scavenger/polymer composition which is melt deposited onto and into the mat structure.

In another embodiment, the subject oxygen scavenger composition can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger composition is thus composed of the pouch or sachet carrier having therein the oxygen scavenger agent, per se, or contained in a polymer matrix and provided for in the form of small particles of sufficient particulate size to permit the sachet structure to retain the particulate therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger agent distributed therein. The ceramic can be formed into any desired shape (e.g., spheres, cubes, cylinders and the like) and size which is suitable for insertion into the container having the oxygen sensitive material. Useful porous inorganic materials include conventional clay, cement pastes and the like.

It has been found that the above described oxygen scavenger compositions can be used for the preservation of oxygen sensitive foods stored at ambient conditions. The present compositions have an advantage over those compositions having oxygen scavengers directly mixed into and forming a filler of a polymer matrix because the present compositions inhibit the release of scavenger agent and/or oxidation by-products which may contaminate the food material. The oxygen scavenger agent of the present invention is a particulate material that contains, as a part of its structure, a moisture-triggerable oxygen scavenging moiety. It has been found that the nature of the system is such that the oxygen scavenging agent is highly reactive with molecular oxygen yet is bound to the hydrotalcite in a manner which substantially prevents migration of the oxygen scavenging moiety or its oxidized product into the packaged material. Therefore, the present invention unexpectedly provides a highly desired oxygen scavenger composition which does not cause discoloration or detract from taste of the packaged food product.

It may be desirable to include in the composition, especially when used as a gasket or the like, a material, which will increase the permeability of the composition to water, for instance a surfactant such as sodium dodecylbenzene sulphonate or other hydrophilic compounds. A suitable amount of a surfactant is between 0.1 and 1.0% by weight.

The amount of the subject oxygen scavenger agent containing particulate is dependent on the type of application. When the particulate is incorporated into a gasket, the amount is normally at least 0.5 weight percent based on the polymeric matrix material, generally at least 1% and preferably at least 2%. It is generally unnecessary for the amount to be above 20% and 4%–10% is often a convenient maximum.

In the case of a plastisol, lacquer, or hot melt applied to the center panel of a closure, where the matrix does not otherwise serve as a gasket, scavenger particulate loadings can be much higher. For example, loadings of 20 weight percent to 60%, or in some cases up to 90% are workable.

When the composition is in the form of a film, mat, pouch or sachet, the oxygen scavenger should be present in an amount to effectively scavenge oxygen during the contemplated storage period of the container for the appropriate contents. An amount in the range of from 0.01 to 2 grams of the oxygen scavenging agent having at least about 60 mole percent oxygen scavenging anion A is normally sufficient to provide desired oxygen scavenging capacity in a normal size (50–1000 ml) container.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end) or as an insert in the form of a film, mat, pouch, sachet or ceramic structure.

The composition of the invention in the form of a film can, for example, be laminated to paperboard to form gable-top cartons. The film may further comprise oxygen barrier layers and/or heat sealable layers.

The invention formed with a polymer matrix in the form of a film can be applied as a center panel lining on a container closure. The closure can be a cap, can end, lid stock or film. The invention also includes container closures carrying a solid deposit formed on the closure from a polymer matrix or film composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the packaged material that is contained within the container body. The container body is preferably of glass or metal. The closure is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging composition is typically not used in the gasket composition because, under typical can seaming conditions, the gasket is not substantially exposed to oxygen in the pack. Also, the seams are not particularly vulnerable to oxygen ingress. The oxygen scavenging composition is typically applied on a center panel or other interior surface in the can, such as applied as a coating of a can.

It is particularly preferred that the gasket or coating on the container closure be formed by applying a fluid or molten composition of the present invention formed with a fluid polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or laminated to the interior liner of the cardboard package, along a line of weakness at the package closure, or at any other convenient location in the package. Alternately, the present composition can be placed within the container as a film, mat or sachet.

Further, the composition of the present invention can be compounded and extruded, injection molded or thermoformed into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multi-layer film, the layer formed of the present composition may be the surface layer which will be exposed to the inner surface of the resultant flexible package or an inner layer which is covered by a surface layer having sufficient permeability to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The compositions can also be used in conjunction with or as a portion of a tamper-evident membrane for pharmaceuticals and foods.

The following examples are given for illustrative purposes only and are not meant to be a limitation on the teaching herein or on the claims appended hereto. All parts and percentages are by weight unless otherwise stated.

In some instances the oxygen scavenger hydrotalcite-like particulate, per se, was tested while in other instances the material was made part of a carrier polymer composition as fully described below. To test for oxygen scavenging capability, each sample was tested in triplicate by being placed in a gas impermeable, vacuum sealed container fitted with a septum to allow gas to be introduced and gas samples removed for periodic analysis. Containers having a sample were injected with 100 cc of room air (ca. 20.6% $O_2$) and pasteurized at 60° C. for 45 minutes and then stored in the dark to avoid photo-oxidation. The headspace oxygen concentration was measured at regular intervals by withdrawing samples which were then analyzed using a MOCON® Model HS-750 Headspace Oxygen Analyzer. All samples were prepared and tested in triplicate and the data was averaged to obtain the reported values.

EXAMPLE I

Preparation of bisulfite-functional hydrotalcite

Under a nitrogen atmosphere, 90 parts of sodium bisulfite were dissolved in 510 parts deionized water which had previously been purged of oxygen with nitrogen. To this solution were added 100 parts of uncalcined HTLC acetate, having a sheet-like morphology and the formula $[Mg_{0.75}Al_{0.25}(OH)_2](O_2CCH_3)_{0.25} \cdot xH_2O$ (obtained from LaRoche Industries, Inc.). The slurry was stirred for 1 hour under nitrogen, and then the solids were collected via vacuum filtration under a nitrogen atmosphere. The material was taken up in 600 parts nitrogen-purged deionized water and stirred for 1 hour. The solids were again collected via vacuum filtration and washed with 6000 parts nitrogen-purged water. The material was dried for 9 hours at 80° C. in a vacuum oven to yield approximately 60 parts of a fine white powder.

EXAMPLE II

Alternate preparation of bisulfite-functional hydrotalcite

Under a nitrogen atmosphere, 22.5 parts of sodium bisulfite were dissolved in 127.5 parts deionized water which had previously been purged of oxygen with nitrogen. To this solution were added 25 parts of an uncalcined, carbonate-functional hydrotalcite with a Mg/Al ratio of about 2.4 ($[Mg_{0.7}Al_{0.3}(OH)_2](CO_3)_{0.15} \cdot xH_2O$), (from Alcoa, HTC-24). The slurry was stirred for 1 hour under nitrogen. The solids were then collected via vacuum filtration under a nitrogen atmosphere and washed with 150 parts of deoxygenated, nitrogen-purged water. The solids were then taken up in 150 parts of deoxygenated, nitrogen-purged water and stirred for 1 hour before again filtering and washing with 2000 parts of deoxygenated nitrogen-purged water. The product was dried in a vacuum oven at 80° C. for 6 hours.

EXAMPLE III

Alternate preparation of bisulfite-functional hydrotalcite

Under a nitrogen atmosphere, 45 parts of sodium bisulfite were dissolved in 255 parts deionized water which had previously been purged with argon. To this solution were added 20 parts of an uncalcined, carbonate-functional hydrotalcite with a Mg/Al ratio of 1.0 ($[Mg_{0.5}Al_{0.5}(OH)_2](CO_3)_{0.25} \cdot xH_2O$) (from Alcoa, HTC-10L). The slurry was stirred for 1 hour under argon with heating to about 60° C. The solids were then collected via vacuum filtration under an argon atmosphere and washed with 600 parts deoxygenated, nitrogen-purged water. The solids were then taken up in 300 parts argon purged water and stirred for 1 hour before again filtering and washing with 1500 parts nitrogen-purged water. The product was dried in a vacuum oven at 80° C. for 6 hours to yield a fine white powder.

EXAMPLE IV

Alternate preparation of bisulfite-functional hydrotalcite

To a reaction vessel fitted with condenser and flushed with argon were introduced 320 parts nitrogen-purged deionized water. 53 parts of sulfurous acid (about 6% $SO_2$ in water) were introduced and the resulting solution heated to 60° C. with stirring under an argon atmosphere. 10 parts of hydrotalcite (HTC-24 of Alcoa) which was calcined at 450° C. for 1 hour were also introduced under positive argon pressure. The resulting slurry was heated to about 90° C. for 6 hours, then allowed to cool to room temperature. The solids were collected via vacuum filtration under nitrogen atmosphere. The product was dried in a vacuum oven at 80° C. for 4 hours to yield a fine white powder.

EXAMPLE V

Preparation of dithionite-functional hydrotalcite

Under a nitrogen atmosphere glove box, 22.5 parts of sodium hydrosulfite were dissolved in 127.5 parts deionized water which had previously been deoxygenated by being purged with argon. To this solution were added 10 parts of uncalcined hydrotalcite described in Example I above. The slurry was stirred for 1 hour under argon, and then the solids collected via vacuum filtration under a nitrogen atmosphere, and then washed with 300 parts of deoxygenated, nitrogen-purged water. The solids were again collected via vacuum filtration and washed with 1500 parts nitrogen-purged water. The material was dried for 4 hours at room temperature in a vacuum oven to yield a fine white powder.

EXAMPLE VI

Preparation of gallate-functional hydrotalcite 2.35 parts sodium hydroxide were dissolved in 150 parts deionized water and the resulting solution purged with nitrogen. Under a nitrogen atmosphere, 10 parts of 3,4,5-trihydroxybenzoic acid (gallic acid) were added to the solution and stirred to form an amber solution. 10 parts uncalcined hydrotalcite described in Example I above, were added to this solution and the slurry stirred under nitrogen atmosphere for 1 hour. The solids were collected under nitrogen via vacuum filtration and rinsed with 150 parts nitrogen-purged deionized water. The solids were taken up in 150 parts nitrogen-purged deionized water and stirred for an additional 1 hour. The solids were again collected via vacuum filtration and rinsed with 2000 parts nitrogen-purged deionized water, at which point the filtrate ran clear. The material was dried for 6 hours at 80° C. followed by 3 hours at 150° C. in a vacuum oven to afford 5.6 parts of a fine amber-colored powder.

EXAMPLE VII

Preparation of ascorbate-functional hydrotalcite

Under a nitrogen atmosphere, 45.0 part of sodium ascorbate were dissolved in 105 parts deionized water which had previously been purged with nitrogen. To this solution were added 20 parts of uncalcined hydrotalcite described in Example I above. The slurry was stirred for 1 hour under nitrogen, then the solids collected via vacuum filtration under nitrogen atmosphere. The material was taken up in 150 parts nitrogen-purged deionized water and stirred for 1 hour. The solids were again collected via vacuum filtration under nitrogen atmosphere and washed with 1500 parts nitrogen-purged water. The material was dried for 6 h at 80° C. in a vacuum oven to yield a fine off-white powder.

EXAMPLE VIII

Preparation of cysteinate-functional hydrotalcite 13.2 parts of sodium hydroxide were dissolved in 400 parts deionized water and the resulting solution purged with argon. Under a nitrogen atmosphere, 40 parts L-cysteine were added to the solution and stirred to form a colorless solution of sodium cysteinate. 20 part of uncalcined hydrotalcite described in Example I above, were added to this solution and the slurry stirred under argon atmosphere for 1 hour. The solids were collected under nitrogen atmosphere via vacuum filtration and rinsed with 600 parts nitrogen-purged deionized water. The solids were taken up in 400 parts argon-purged deionized water and stirred for an additional 1 hour. The solids were again collected via vacuum filtration and rinsed with 2000 parts nitrogen-purged deionized water. The material was dried for 8 hours at 80° C. in a vacuum oven to afford 13.4 parts of a fine off-white powder.

EXAMPLE IX

Preparation of cystinate-functional hydrotalcite 6.7 parts sodium hydroxide were dissolved in 400 parts deionized water and the resulting solution purged with argon. Under a nitrogen atmosphere, 20 parts L-cystine were added to the solution and stirred to form a colorless solution. 20 parts uncalcined hydrotalcite described in Example I above, were added to this solution and the slurry stirred under argon for 1 hour. The solids were collected via vacuum filtration and rinsed with 600 parts nitrogen-purged deionized water. The solids were taken up in 400 parts argon-purged deionized water and stirred for an additional 1 hour. The solids were again collected via vacuum filtration and rinsed with 2000 parts nitrogen-purged deionized water. The material was dried for 6 hours at 80° C. in a vacuum oven to afford 16.5 parts of a fine off-white powder.

EXAMPLE X

Moisture-triggered oxygen scavenging test method

One gram samples of the anion exchanged hydrotalcite-like materials formed in Examples I–IX above were placed in gas impermeable pouches fitted with septa and heat sealed under vacuum. For comparative purposes, the sodium salt of the bisulfite, ascorbate and gallate were also tested by placing in gas impermeable pouches of the same type. One gram of water and 100 cc of air were then introduced through the septa. The oxygen content of each pouch was measured at regular intervals thereafter by withdrawing 3 cc samples of the atmosphere in the pouches via gas syringe and injecting into a MOCON® model HS 750 Headspace $O_2$ Analyzer. Samples were measured in triplicate. Samples without added water were also monitored to test stability in the absence of added water. In all cases the samples without water added showed no significant scavenging activity. The results are shown in the Table I below:

TABLE I

| SYSTEM | RATE @ 1 day (mmoles $O_2$/g/day) | CAPACITY @ 1 week (mmoles $O_2$/g) |
|---|---|---|
| Hydrotalcite Bisulfite, Ex. I | 690 | 1310 |
| Hydrotalcite Bisulfite, Ex. II | n.a. | 360 |
| Hydrotalcite Bisulfite, Ex. III | 490 | 520 |
| Hydrotalcite Bisulfite, Ex. IV | 270 | 410 |
| Hydrotalcite Dithionite, Ex. V | 60 | 230 |
| Hydrotalcite Gallate, Ex. VI | 170 | 240 |
| Hydrotalcite Ascorbate, Ex. VII | 320 | 600 |
| Hydrotalcite Cysteinate, Ex. VIII | 150 | 380 |
| Hydrotalcite Cysteinate + $CuCl_2$[1] | 700 | 740 |
| Hydrotalcite Cystinate, Ex. IX | 100 | 430 |
| Sodium Bisulfite | 130 | 320 |
| Sodium Gallate | n.a. | 210 |
| Sodium Ascorbate | 30 | 100 |

[1] 1 mg $CuCl_2$ dissolved in the 1 g $H_2O$ added to the pouch.

EXAMPLE XI

The shelf stability and thermal stability of the bisulfite-functional hydrotalcite-like material was tested as follows:

A quantity of the material was exposed to ambient indoor air for 90 days and then tested using the previously described method of Example X. No significant decrease in activity was noted. A quantity of the material was placed in an oven pre-heated to 215° C. for 12 minutes in air and then tested using the previously described method of Example X. No significant decrease in activity was noted.

The shelf stability and thermal stability of the bisulfite-functional hydrotalcite were also tested as follows:

A quantity of the material was exposed to ambient indoor air for 90 days and then tested using the previously described method; no significant decrease in activity was noted.

A quantity of the material was placed in an oven preheated to 215° C. for 12 minutes in air and then tested using the previously described method; no significant decrease in activity was noted.

EXAMPLE XII

Closure compositions composed of polyvinyl chloride containing bisulfite exchanged hydrotalcite-like material as formed in Example I above was exposed to water and low levels of oxygen to mimic conditions inside a food or beverage package packed under nitrogen. After 10 days, the water was analyzed for sulfite and sulfate (oxidation product). For comparative purposes sodium sulfite and sodium bisulfite were also treated and examined in the same manner.

a) PVC Plastisol: The scavenging materials at the levels indicated in the table below were stirred into a PVC plastisol closure composition. Sodium sulfite and sodium bisulfite were first ground in a mortar and pestle to provide finer particles with higher surface areas. The plastisols were then poured into circular molds and fused at 215° C. for 3 minutes to form discs weighing approximately 2 g.

b) PVC Dry Blend: The scavenging material was blended into a PVC dry blend closure composition by vigorous shaking. The powder mix was then formed into sheets on a hot press at 300° F. Discs weighing approximately 330 mg were pushed out.

The discs were placed in gas impermeable pouches (1 disc per pouch for plastisol compounds, 6 discs per pouch for dry blend compounds) fitted with septa and heat sealed under vacuum. Two grams of ultrapure water and 100 cc of an approximate 1% oxygen/99% nitrogen blend were then introduced through the septa. The pouches were then pasteurized at 60° C. for 45 minutes. Samples were prepared in triplicate. After 10 days, the liquid contents were withdrawn and fixed with 5% aqueous formaldehyde so that sulfite/bisulfite would not oxidize further. The samples were then analyzed by ion chromatography for sulfite and sulfate content. The results are shown in the table below:

| SYSTEM | LOADING LEVEL | SULFITE (ppm) | SULFATE (ppm) | TOTAL MIGRATION, % OF THEORY |
|---|---|---|---|---|
| PVC PLASTISOL GASKETS: | | | | |
| Sodium sulfite | 3.5% | 3880 ± 4600[1] | >>10,000[2] | >>50 |
| Hydrotalcite bisulfite | 3.5% | 5330 ± 1600 | 6050 ± 1350 | 40 |
| Sodium bisulfite | 3.5% | <DL[3] | 190 ± 5 | 4 |
| Hydrotalcite-bisulfite | 8.75% | <DL | 350 ± 60 | 3 |
| PVC DRY-BLEND CROWNS: | | | | |
| Hydrotalcite bisulfite | 5.0% | <DL | 920 ± 280 | 10 |

[1]This set included an unusually low value of 20 ppm associated with a correspondingly high sulfate measurement.
[2]2 Off scale.
[3]Detection Limit (DL) = 3 ppm.

It is readily apparent that the samples bisulfite-modified hydrotalcite-like material evidenced no detectable sulfite migration, whereas both the sodium sulfite and the sodium bisulfite samples evidenced levels that were significant fractions of the theoretical maxima. Similarly, the hydrotalcite samples displayed very low levels of sulfate migration compared to the controls.

What is claimed:

1. A hydrotalcite-like material represented by the formula

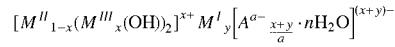

wherein $M^I$ represents an alkali metal selected from sodium or potassium; $M^{II}$ represents magnesium, zinc, nickel, copper, cobalt and mixtures thereof; $M^{III}$ represents aluminum, chromium, iron and mixtures thereof; A represents an anion, at least 60 mole percent of said anion composed of oxygen scavenger anion selected from bisulfite, dithionite, ascorbate, thiolate, phenolate or mixtures thereof; x is a numerical value of from about 0.1 to 0.5; a is an average numerical value of the valence of A; y represents 0 when "a" is less than 2 and a value of from 0 to 0.5 when "a" is at least 2; and n is a numerical value of from 0 to 4.

2. The product of claim 1 wherein $M^{II}$ is at least 50 mole percent Mg and $M^{III}$ is at least 50 mole percent Al.

3. The product of claim 1 wherein the oxygen scavenger anion A is selected from ascorbate anion, thiolate anion, phenolate anion or mixtures thereof.

4. The product of claim 2 wherein the oxygen scavenger anion A is selected from ascorbate anion, thiolate anion, phenolate anion or mixtures thereof.

5. The product of claim 1 wherein the oxygen scavenger anion A is bisulfite.

6. The product of claim 2 wherein the oxygen scavenger anion A is bisulfite.

7. The product of claim 3 wherein the oxygen scavenger anion A is ascorbate anion.

8. The product of claim 4 wherein the oxygen scavenger anion A is ascorbate anion.

9. A composition comprising a carrier having substantially uniformly distributed therein the oxygen scavenger hydrotalcite-like particulate material of claim 1, 2, 3, 4, 5, 6, 7, or 8.

10. The composition of claim 9 wherein the carrier comprises a polymer matrix having at least 0.5 weight percent of the oxygen scavenger hydrotalcite-like material distributed therein.

11. The composition of claim 10 wherein the carrier is a thermoplastic resin selected from the group consisting of polyethylene, ethylene/vinyl acetate copolymers, vinyl chloride homopolymers, vinyl chloride copolymers and blends thereof.

12. The composition of claim 10 wherein the carrier is a polymer matrix comprising polyethylene selected from the group consisting of high, low, very low, ultra low, and linear low density polyethylenes, blends thereof and blends of said polyethylene with other polymers.

13. The composition of claim 10 wherein the carrier is a polymer matrix comprising a mixture of at least one polyethylene and at least one ethylene/vinyl acetate copolymer.

14. The composition of claim 10 wherein the carrier is a polymer matrix comprising a polymer selected from the group consisting of polyolefin, ethylene/vinyl acetate copolymer, butyl rubber, styrene/butadiene rubber, styrene/butadiene/styrene block copolymers, isoprene, styrene/isoprene/styrene block copolymers styrene/ethylene/butylene/styrene block copolymers, and mixtures thereof.

15. The composition of claim 10 wherein the carrier is a polymer matrix comprising one or more vinyl chloride resin.

16. The composition of claim 10 wherein the carrier is a polymeric matrix comprising an epoxide, phenolic, polyurethane, polyvinyl chloride homopolymer, polyvinyl chloride copolymers and mixtures thereof.

17. A product that is a container having an interior cavity suitable to contain an oxygen sensitive material which has, as at least part of said container and exposed to the interior of said container, the composition of claim 13.

18. A product that is a container having an interior cavity suitable to contain an oxygen sensitive material which has, as at least part of said container and exposed to the interior of said container, the composition of claim 10.

19. A product that is a container having an interior cavity suitable to contain an oxygen sensitive material which has, as at least part of said container and exposed to the interior of said container, the composition of claim 11.

20. A product that is a container having an interior cavity suitable to contain an oxygen sensitive material which has, as at least part of said container and exposed to the interior of said container, the composition of claim 12.

21. A product that is a container having an interior cavity suitable to contain an oxygen sensitive material which has, as at least part of said container and exposed to the interior of said container, the composition of claim 13.

22. A product that is a container having an interior cavity suitable to contain an oxygen sensitive material which has, as at least part of said container and exposed to the interior of said container, the composition of claim 14.

23. A product that is a container having an interior cavity suitable to contain an oxygen sensitive material which has, as at least part of said container and exposed to the interior of said container, the composition of claim 15.

24. A product that is a container having an interior cavity suitable to contain an oxygen sensitive material which has, as at least part of said container and exposed to the interior of said container, the composition of claim 16.

25. The product of claim 1, 2, 3, 4, 5, 6, 7 or 8 wherein y is 0.

26. The composition of claim 9 wherein y is 0.

27. A method of scavenging oxygen contained in a closed interior cavity of a container comprising exposing, in the presence of moisture, the interior cavity of said container to a composition of claim 1, 2, 3, 4, 5, 6, 7 or 8.

* * * * *